United States Patent [19]

Osborne

[11] Patent Number: 4,865,353
[45] Date of Patent: Sep. 12, 1989

[54] ABRASION RESISTANT CERAMIC ELBOW

[76] Inventor: Lee R. Osborne, Rte. 2, Box 60-H, Cedar Bluff, Va. 24609

[21] Appl. No.: 161,939

[22] Filed: Feb. 29, 1988

[51] Int. Cl.$^4$ .......................... F16L 9/14; F16L 58/00
[52] U.S. Cl. ...................................... 285/16; 285/55; 285/176; 285/179
[58] Field of Search .................... 285/16, 17, 179, 127, 285/176, 55

[56] References Cited

U.S. PATENT DOCUMENTS

| | | | |
|---|---|---|---|
| 1,981,089 | 11/1934 | Fender | 285/16 X |
| 4,684,155 | 8/1987 | Davis | 285/16 |
| 4,733,889 | 3/1988 | Haines | 285/16 |

FOREIGN PATENT DOCUMENTS

| | | | |
|---|---|---|---|
| 272588 | 6/1927 | United Kingdom | 285/16 |
| 2165328 | 4/1986 | United Kingdom | 285/179 |

Primary Examiner—Thomas F. Callaghan
Attorney, Agent, or Firm—Sughrue, Mion, Zinn, Macpeak & Seas

[57] ABSTRACT

A pipe elbow for transmission of abrasive materials therethrough defining a square or rectangular cross-sectional shaped flow passageway in the area wherein the direction of flow of said abrasive material is changed, said pipe elbow including an outer casing comprised of planar or curved planar surfaces having an outer and an inner surface, said pipe elbow further including a plurality of tiles lining the entire inner surface of said outer casing so that the inner surfaces of the tiles define a flow path defined by at least four sides of a box shaped bend section comprising a deflection wall receiving the greatest abrasive force, two side walls parallel to each other and perpendicular to the deflection surface, and a fourth wall perpendicular to the side walls and facing the deflection wall, said inner tiles having a substantially greater wear resistance to abrasive material flowing therethrough than said outer casing. When the elbow having a square or rectangular cross-sectional shaped flow passageway is mated to a pipe having a circular mating surface, fluid turbulance in the transition area between the square or rectangular cross section area of the elbow and the round cross section area is held to a minimum by the provision of corner transition tiles.

5 Claims, 2 Drawing Sheets

ABRASION RESISTANT CERAMIC ELBOW

FIELD OF THE INVENTION

The invention relates to an abrasion resistant bend or elbow-like construction and more particularly to an abrasion resistant bend construction having design characteristics which impart ease of manufacture and repair as well as superior wear resistance.

BACKGROUND OF THE INVENTION

The need to move large volumes of highly abrasive materials, such as coal, grain, sand, and various waste products, places great demands on the piping systems through which they are conveyed. Excessive wear is a common problem, especially evident in the sections of pipe which change the direction of flow of the abrasive material.

As is known, upon a change in direction of flow of a fluid containing abrasive particles, the wall facing the oncoming stream is subjected to a continuous bombardment of such particles. The result is that the outer bends of the pipes in these transport systems are rapidly worn down and the fittings must be replaced or patched at frequent intervals to prevent leakage of dust, contamination of the surrounding atmosphere, et cetera, so as to avoid health hazards as well as explosive situations. The down time and other costs accrued in the need to continually make such repairs represent a substantial economic loss.

In conveying abrasive materials such as, for example, coal in a slurry, curved sections of pipe may be made of a highly durable material in order to withstand abrasive contact with the material being conveyed therethrough. For this purpose, it is a well known practice to provide pipe elbows with an abrasion resistant inner lining to increase the wear life of the pipe elbow. Due to their excellent wear characteristics, ceramic brick and ceramic materials have become increasingly popular for use in lining pipe casings subjected to high abrasive wear conditions.

One known method for providing a ceramic inner wear liner for a pipe fitting involves bricking the inner surface of the pipe elbow casing with a plurality of ceramic wear bricks. The wear bricks are fitted into position inside the casing in a series of rings in a keystone arrangement along the length of the elbow. Unfortunately, it is extremely expensive to provide a ceramic inner lining for a pipe elbow in this fashion because each brick is differently sized and shaped according to its angular location about the center line of the pipe elbow. Nevertheless, the use of ceramic wear bricks to totally line the inner surface of a pipe elbow results in a pipe elbow having an improved wear life.

In U.S. Pat. No. 1,246,189 an elbow construction is described which consists of two separate semi-cylindrical sections with the medial portion of one section being enlarged to accommodate a recess into which lining blocks are inserted.

Another approach is illustrated in U.S. Pat. No. 3,977,730 where an impact plate is fixed to the outside surface of the outer bend of the pipe elbow.

In U.S. Pat. No. 3,794,359, a pipe elbow fabricated entirely from non-metallic materials is described. The elbow consists of a pair of wear plates of ceramic material having a semi-circular shape and assembled circumferentially in opposing spaced relationship to each other. A resinous grout is disposed in the circumferential space between the opposed wear plates and a fiberglass reinforced resin provides a cover over the wear plates and grout.

However, in each of these pipe elbows there remains much room for improvement in wear resistance, ease of manufacturability and ease of repair. It is an object of the present invention to provide an abrasion resistant bend construction for abrasive material conveying pipelines which overcomes problems of cost of manufacture, high wear, and expanse of maintenance.

SUMMARY OF THE INVENTION

Accordingly, it is an object of the present invention to provide an improved pipe elbow particularly adapted for transporting highly abrasive materials therethrough.

It is a further object of the present invention to provide a pipe elbow having an inner abrasive resistant ceramic tile lining of a construction which exhibits greatest resistance to wear.

It is yet a further object of the present invention to provide a pipe elbow of a design to permit using a wear resistant ceramic tile liner of a relatively inexpensive construction.

An additional object of the present invention is to provide a pipe elbow having the above features in which the ceramic wear bricks aligned along the outside center line of the pipe elbow have a wearing surface which more widely distributes the area of highest abrasive contact from material flow.

Another object of the present invention is to provide a pipe elbow having all of the above features and which is constructed to easily and reliably permit replacement of worn out ceramic tiles to thereby further extend the useful life of the elbow.

Related objects and advantages of the present invention will become more apparent by reference to the following figures and detailed description.

BRIEF DESCRIPTION OF THE DRAWINGS

FIG. I is a front view showing a typical 12" 1.5 D radius box elbow affixed to a typical 12" diameter circular pipe; both ends of the elbow terminate in a flat pipe flange.

FIG. II is a side elevation view of the pipe elbow with tiles in place.

Figure 1:
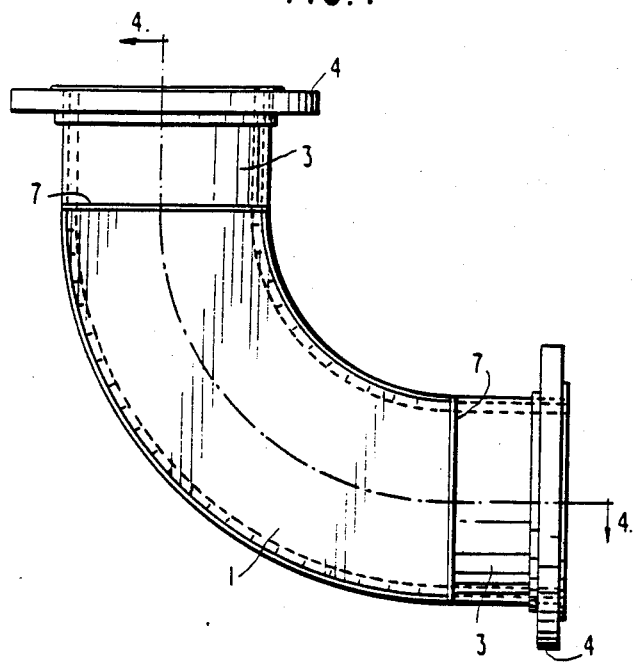
Figure 2:
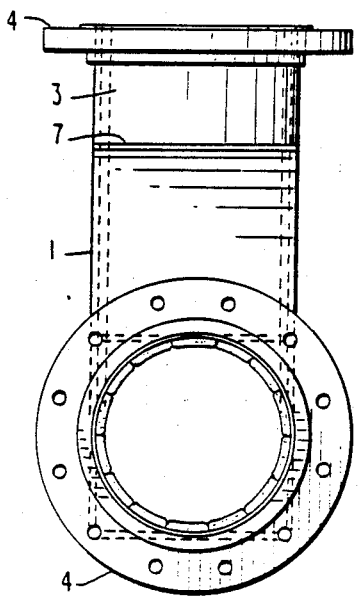
Figure 3:
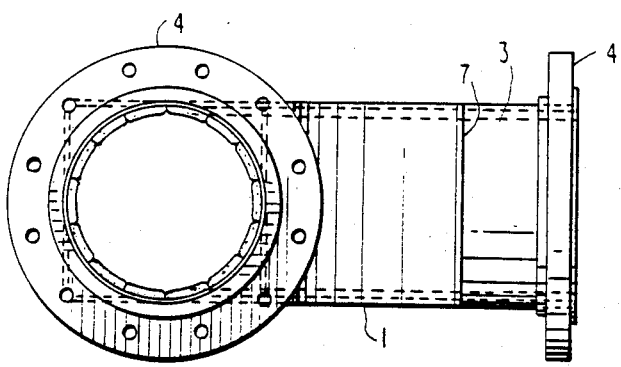
Figure 4:
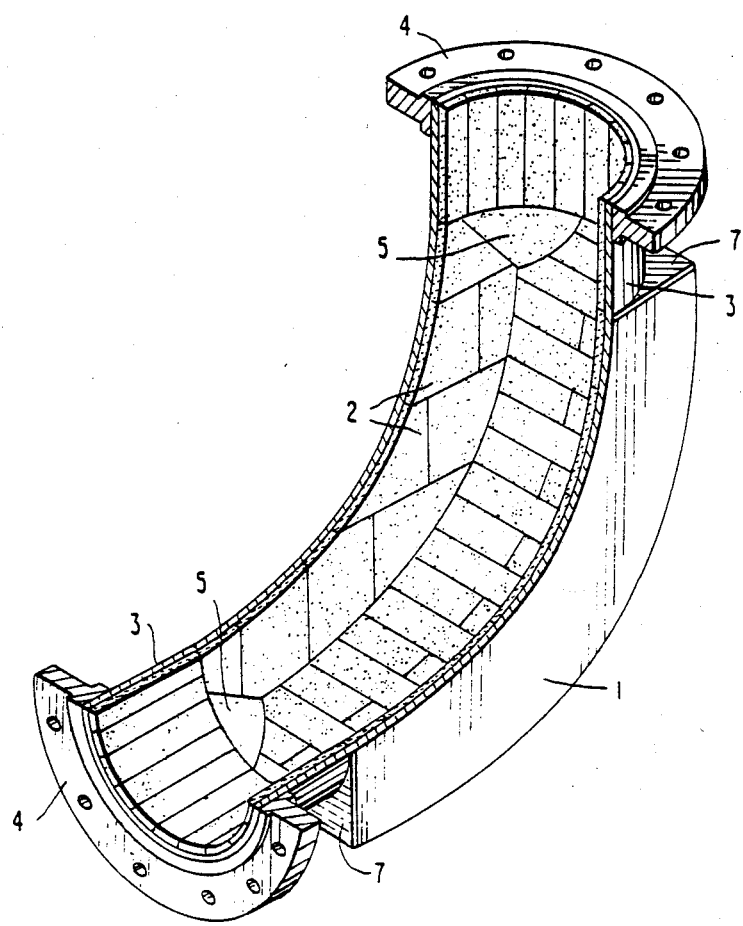

FIG. III is a top view showing the round pipe, with tiles in place.

FIG. IV is an isometric section showing the tile lining 2 & 8, and the transition pieces 5 that make it possible to maintain a smooth flow of the fluid being transported through the box elbow 1 to a round cross section tangent 3.

DETAILED DESCRIPTION OF THE INVENTION

The present invention concerns pipe fittings or sections forming part of a conveyor or conduit system for fluent materials, particularly liquids and gases carrying abrasive particles in suspension, and to the means for protecting such fittings against wear and thereby prolonging the life thereof.

More specifically, the invention relates to pipe fittings or sections, such as elbows, Y's and T's and the like, which act to change the direction of flow of abrasive fluent material and are lined with an abrasion-resistant material.

From a review of the prior art, it is apparent that prior investigators have assumed that metallic pipe sections, including angular fittings, for conveyor systems for abrasive slurries and the like, must inherently or of necessity be of circular cross-section to avoid eddies or throttling and surging of abrasive materials, and to achieve the optimum conditions for flow. The present invention departs from this universally accepted tradition-bound approach.

The present invention departs from the prior basic assumption that for best results pipe sections, including angular fittings, must be circular in cross-section. I have found that by making the angular pipe fitting itself of nonuniform cross-section in comparison with the regular cylindrical straight sections of pipe leading to and from it, unexpected advantages are secured with regard to the lining of such fittings.

It is the general object of the invention to provide an improved elbow design and geometry for such pipe fittings, which are usually made of cast iron or steel, but may be made of other materials, the ceramic tile or abrasion resistant surface in combination with the new design improving the wear resistance and hence the life of fittings protected thereby, the ceramic tiles further being characterized by ease of manufacture and assembly.

As the invention is of particular utility in connection with elbows, it will be further described in detail in connection with such pipe or conduit elements, but it will be understood that the invention is equally applicable to other fittings which are designed to change the direction of a flowing abrasive material.

The invention concerns pipe elbow especially designed to provide an optimal mix of low surface wear, ease and low cost in manufacture and replacement, and having improved flow characteristics for the fluid flowing in the elbow.

In accordance with the present invention, pipe fittings, and particular elbows, which are designed to change the direction of flow of fluid material, are so constructed that they expose a planar impact surface area, i.e., deflection wall area, at the impact region, having a greater surface area than a conventional circular shaped elbow. The region of impact of an elbow extends along the outer curved portion of the elbow, although the intensity of the impact from suspended particles is not uniform along the length of the elbow.

An elbow constructed as just described is capable of receiving an abrasion-resistant lining of natural or synthetic rubber or other elastic material, or preferably a plurality of abrasion resistant bricks or tiles, such as aluminum oxide tiles, which form a substantially planar overlay at the region of impact. A thicker portion of the lining has a greater life span than a thinner lining, not only because its greater thickness will insure a longer period of use before it is entirely destroyed, but because, being thicker, particularly in the case of rubbery lining materials, it has a greater cushioning effect on the impacting particles and so will not wear as rapidly as a thinner lining which, by reason of being secured in close proximity to the rigid metallic fitting wall, lacks the yielding qualities of the thicker lining.

The inventive elbow is designed to replace elbows particularly in abrasive material handling pipe systems where high abrasion results in low elbow life. Specific applications where the inventive elbow is particularly cost effective include pipe systems in coal preparation facilities, sand and gravel processing facilities, power plants, paper plants, foundries, steel mills, and phosphate mine processing facilities.

One embodiment of the present invention is characterized by a pipe elbow having a casing and a plurality of ceramic tile liners disposed within the casing. The inner wear tiles define a generally square cross sectional flow passageway along the length of the pipe elbow. Each of the wear bricks has a planar shaped surface which faces in a direction towards the center line of the pipe elbow.

The pipe elbow of the present invention is comprised, for example, of a metal housing of a preferably square cross sectional shape lined with preferably flat ceramic liners. The housing may be formed of welded-together hard steel. The plurality of ceramic wear liners are held in place inside the metal housing by the fit of the pieces and, if desired, epoxy glue.

The elbow according to the present invention preferably consists of three distinct functional components: The deflection section, consisting of (1) a box elbow of square cross section, dimensioned to present a slightly larger abrasive material impingement area than conventional circular cross section elbows, (2) cylindrical tangent pipe inlet and outlet sections, and (3) preferably flow uniformity facilitating components, preferably comprised of two sets of four alumina corner transition tiles located between the square and circular cross sectional components.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings in detail, the pipe elbow of the present invention can generally be seen from FIG. IV. The pipe elbow includes an outer metallic casing 1 of generally square or rectangular cross-sectional shape "box" housing the planar tiles 2. The box shaped portion of the elbow is connected to a circular tangents 3, which terminate in angular shaped connecting flanges 4 welded to ends of the tangent 3, the flanges serving to connect the pipe elbow to similarly formed flanges on adjacent pipe sections. To improve flow in the transition area between the circular and square cross sectional areas, corner transition tiles 5 are provided as shown.

While the pipe elbow shown in FIG. 1 is a standard 90 degree 1 1.5 D elbow, the invention is not restricted thereto, and may include other curved shapes and radiuses.

Sides of the outer casing, of which 1, 3, and 7 are shown, are welded at their joints. A removable top cover plate, not shown, for access to and replacement of tiles may be bolted to sides by mounting bolts and sealed by a gasket. The outer casing 1, 3, and 7 may be made of any suitable pipe casing material such as, for example, stainless steel.

Manufacture

Presently accepted methods of lining pipe elbows with solid alumina oxide tiles utilize pattern-cut curved bricks of a monolithic cast alumina body, bevel cut to fit the circular elbow. These methods are both expensive and unreliable. According to the present invention, the elbow preferably has round tubular pipe entry and exit sections for mating to the effluent and affluent pipes, a transition section provided with ceramic corners going to transit into and out of the ceramic-lined box, and a pleurality of abrasion resistant bricks or ceramic tiles which form a substantially planar overlay at the region of the impact area in the box type elbow, thus providing a simplified and practical means to line pipe elbows. Field trials have shown that this design is unsurpassed as an economical, high-performance alternative to present designs.

Flow Characteristics

The flow characteristics of the fluid in the elbow are improved by a specially-designed set of transition tiles at the juncture of the square-section angular deflector with the round-section, variable-length entry and exit flange pipes or Dresser Couplings. The transition tiles are shaped to smooth transitional flow velocities, minimize turbulence and reduce non-frictional fluid resistance.

The fluid flow enters at one end of the unit, with flow basically laminar in nature. Under normal operating conditions, as the flow transitions from a circular-section flow to a square-section flow via a set of 4 specially-shaped alumina tiles, it experiences an estimated 21% reduction in flow velocity (and a concomitant 38% decrease in dynamic pressure) thus reducing wear on the wear tiles in the bend of the square-section portion as the abrasive materials change direction. The flow velocity increases as the flow transitions back to a circular-section flow through an additional set of 4 tiles at the juncture between the square section and the circular outlet section. In this way, the special design of the elbow according to the present invention distributes higher flow velocity and higher inertial forces over areas subject to less wear stress while lowering dynamic impact pressure in the impact portion of the square section, where impact forces normally abound.

Ease of manufacture and replacement is made possible through use of a square-section flow angular deflection section, specially designed to permit use of flat tiles and appropriately flat mating surfaces. This, in turn, decreases the cost of manufacturing and replacement because a flat metallic stock may be used. At the same time, the flat-surface configuration improves the bond between the Alumina tiles and the surface.

Materials

The materials for manufacture of tiles are not particularly limited, and may be any of the conventional tile materials employed in the art. Preferred are ceramic materials, and more preferred are ceramic alumina oxide ceramic materials. An example of a suitable material is manufactured by Ferro, 1230 Railroad Street, East Liverpool, Ohio 43920.

Wear Resistance

Exceptionally low wear is afforded through the use of an array of durable abrasion resistant tiles, preferably Alumina Oxide ceramic tiles. This tile lining prolongs the life of the elbow. At the same time, a larger cross section is used in the region of maximum fluid dynamic pressure, thereby lowering the erosion effects due to fluid/particulate impact.

An example of the measure of increase of life efficiency of the elbow according to the present invention over conventional round elbows of super hard nichrome metals is based on an experimental field test at Bowater Paper Company in Calhoun, Tennessee.

The cyclone system employed at Bowater to pull bottom ash from a furnace system was wearing 6" diameter nichrome 90 degree elbows out in an average of three weeks (504 hours). The nichrome elbow was replaced with an elbow according to the present invention. The inventive elbow was installed June 26, 1987 and was replaced November 9, 1987 after 3,264 hours of operation. This represents a 647% increase in life.

Subsequent experiments, still in progress, involve varying the thickness of the liner in the impact area to determine optimum thicknesses for different applications. The thinner the wear layer required for the particular application, the lower the cost of the elbow.

Due to the ease of substitution of different liner thickness, for example, by using the same housing and selecting for employment therein either $\frac{1}{2}$", 1" or 2" thick tiles, it becomes possible to easily customize the elbow to the specific need, as dictated by type of abrasive material carried, inlet and overall pipe diameters, flow velocities, etc.

Another method for providing a ceramic inner lining involves pouring a castable ceramic material inside the casing of the pipe elbow in the space between the casing and a sacrificial liner. The inner disposed sacrificial liner is constructed to wear away very quickly in use, thereupon exposing the wear resistant castable ceramic. Unfortunately, while a castable ceramic liner is much cheaper to construct than a wear liner composed of ceramic wear bricks, it is not nearly as resistant to wear.

Repair

An inherent disadvantage in the construction of many pipe elbows having wear resistant inner liners is that once they have worn through they are often not repairable. This is unfortunate because frequently only a portion of the wear liner along the outside center line of the pipe elbow has experienced substantial wear. Since it is very expensive to replace an entire pipe elbow, it would be a significant cost savings to replace only the worn out sections of the elbow so as to render it useful for further service. Optimally, the pipe elbow should be constructed so as to permit easy removal. Repairs can be made on-site without having to remove the elbow from the operation.

What is claimed is:

1. A pipe elbow for allowing the transmission of abrasive materials therethrough defining a substantially rectangular cross-sectional shaped flow passageway in an area wherein the direction of flow of said abrasive material is changed, said elbow comprising a rectangular end plate having a circular opening therethrough secured to each end of said elbow to define four corner portions, mating portions having a circular cross-section secured to each end plate in alignment with said circular openings, and a plurality of corner tiles disposed in the rectangular cross-sectional shaped flow passageway with each corner tile closing off one of said corner portions in the transition area between said rectangular cross-sectional passageway and said mating portions having a circular cross-section to provide for the smooth flow of materials from said elbow to said mating portions.

2. A pipe elbow as in claim 1, wherein said pipe elbow includes an outer casing comprised of planar or curved planar surfaces having an outer and an inner surface, said pipe elbow further includes a wear resistant lining which lines the entire inner surface of said outer casing so that the inner surfaces of the tiles define a flow path defined by at least four sides of a box shaped bend section comprising a deflection wall receiving the greatest abrasive force, two side walls parallel to each other and perpendicular to the deflection surface, and a fourth wall perpendicular to the side walls and facing the deflection wall, said lining having a substantially greater wear resistance to abrasive material flowing therethrough than said outer casing.

3. A pipe elbow as in claim 2, wherein said inner lining comprises a plurality of tiles lining the inner surface of said outer casing and mating with said corner tiles.

4. An apparatus as in claim 1, wherein the tiles are comprised of rubber, latex, brick, or ceramic materials.

5. A pipe elbow as in claim 2, wherein said tiles are composed of ceramic alumina oxide.

* * * * *